(12) United States Patent  
Chauviere et al.

(10) Patent No.: US 8,249,043 B2  
(45) Date of Patent: Aug. 21, 2012

(54) METHOD OF DATA TRANSMISSION IN A MULTI-CARRIER BASED TRANSMISSION SYSTEM AND DEVICE IMPLEMENTING THE METHOD

(75) Inventors: Benoit Chauviere, Rennes Cedex (FR); Arnaud Bouttier, Rennes Cedex (FR); Loic Brunel, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 740 days.

(21) Appl. No.: 12/025,386

(22) Filed: Feb. 4, 2008

(65) Prior Publication Data

US 2008/0187005 A1    Aug. 7, 2008

(30) Foreign Application Priority Data

Feb. 6, 2007  (EP) .................................... 07002520

(51) Int. Cl.  
*H04J 1/00* (2006.01)
(52) U.S. Cl. .......................... 370/343; 370/330; 375/267
(58) Field of Classification Search .................. 370/343, 370/345, 441, 442, 537; 375/267  
See application file for complete search history.

(56) References Cited

U.S. PATENT DOCUMENTS

| | | | |
|---|---|---|---|
| 6,788,710 B1 * | 9/2004 | Knutson et al. ............... | 370/535 |
| 6,870,826 B1 | 3/2005 | Ishizu | |
| 7,221,680 B2 * | 5/2007 | Vijayan et al. ................ | 370/441 |

FOREIGN PATENT DOCUMENTS

EP    1 045 522 A1    10/2000

OTHER PUBLICATIONS

"E-UTRA DL—Localized and distributed transmission", Ericsson, TSG-RAN WG1 LTE Ad Hoc, R1-060095, XP-002446540, 5.1.2.4, Jan. 23-25, 2006, 3 Pages.  
"E-UTRA DL multiplexing—Multiplexing of reference signals, L1/L2 control signaling, and shared channel", Ericsson, TSG-RAN WG1, R1-060097, XP-002446541, 5.1.2.4, Jan. 23-25, 2006, 2 Pages.

* cited by examiner

*Primary Examiner* — Pao Sinkantarakorn  
*Assistant Examiner* — Kan Yuen  
(74) *Attorney, Agent, or Firm* — Oblon, Spivak, McClelland, Maier & Neustadt, L.L.P.

(57) ABSTRACT

The invention concerns multi-carrier based digital telecommunication systems where the channel is used to transport several data streams according to the frequency division multiple access scheme.

The proposed method concerns a mapping of data on physical resource in a transmission system where data of elementary streams is distributed over several physical resource blocks, and within each resource block in order to get data from a plurality of elementary streams on at least one sub-carrier and at least a symbol time of each physical resource block. This allows to achieve a good diversity of the allocation of the different streams, leading to the advantage, among others, that poor transmission conditions affecting a particular sub-carrier or a particular time duration, will not concentrate its effects on a particular stream.

16 Claims, 17 Drawing Sheets

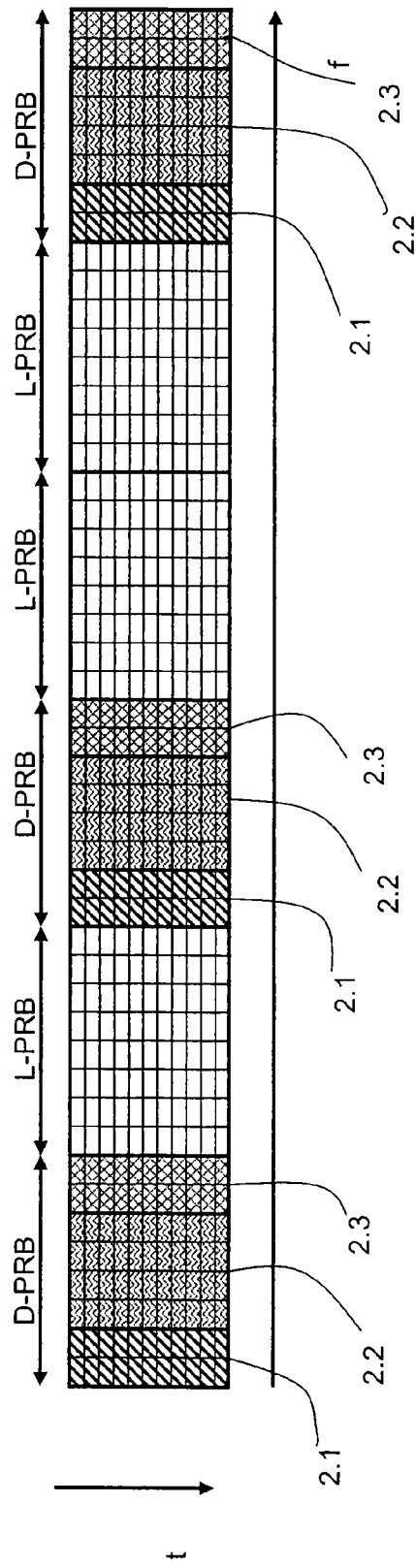

| (0,0) | (1,0) | (2,0) | (3,0) | (4,0) | (5,0) | (6,0) | (7,0) | (8,0) | (9,0) | (10,0) | (11,0) |
|---|---|---|---|---|---|---|---|---|---|---|---|
| (0,1) | (1,1) | (2,1) | (3,1) | (4,1) | (5,1) | (6,1) | (7,1) | (8,1) | (9,1) | (10,1) | (11,1) |
| (0,2) | (1,2) | (2,2) | (3,2) | (4,2) | (5,2) | (6,2) | (7,2) | (8,2) | (9,2) | (10,2) | (11,2) |

⇓

| (0,0) | (0,2) | (0,1) | (3,0) | (3,2) | (3,1) | (6,0) | (6,2) | (6,1) | (9,0) | (9,2) | (9,1) |
|---|---|---|---|---|---|---|---|---|---|---|---|
| (1,1) | (1,0) | (1,2) | (4,1) | (4,0) | (4,2) | (7,1) | (7,0) | (7,2) | (10,1) | (10,0) | (10,2) |
| (2,2) | (2,1) | (2,0) | (5,2) | (5,1) | (5,0) | (8,2) | (8,1) | (8,0) | (11,2) | (11,1) | (11,0) |

Fig. 7b

| (0,0) | (1,0) | (2,0) | (3,0) | (4,0) | (5,0) | (6,0) | (7,0) | (8,0) | (9,0) | (10,0) | (11,0) |
|---|---|---|---|---|---|---|---|---|---|---|---|
| (0,1) | (1,1) | (2,1) | (3,1) | (4,1) | (5,1) | (6,1) | (7,1) | (8,1) | (9,1) | (10,1) | (11,1) |
| (0,2) | (1,2) | (2,2) | (3,2) | (4,2) | (5,2) | (6,2) | (7,2) | (8,2) | (9,2) | (10,2) | (11,2) |

⇓

| (0,0) | (0,2) | (0,1) | (3,0) | (3,2) | (3,1) | (6,0) | (6,2) | (6,1) | (9,0) | (9,2) | (9,1) |
|---|---|---|---|---|---|---|---|---|---|---|---|
| (10,1) | (1,0) | (1,2) | (1,1) | (4,0) | (4,2) | (4,1) | (7,0) | (7,2) | (7,1) | (10,0) | (10,2) |
| (11,2) | (11,1) | (2,0) | (2,2) | (2,1) | (5,0) | (5,2) | (5,1) | (8,0) | (8,2) | (8,1) | (11,0) |

Fig. 7c

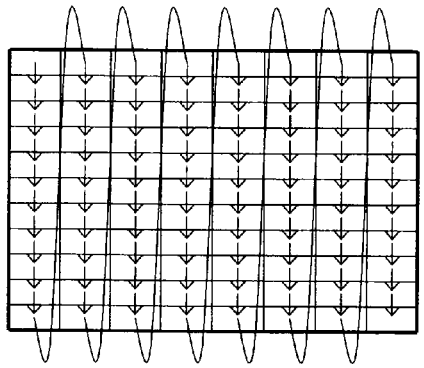
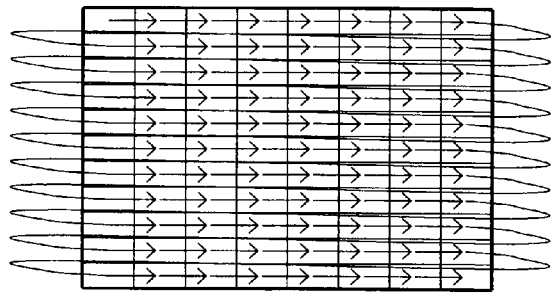
Fig. 8aFig. 8b
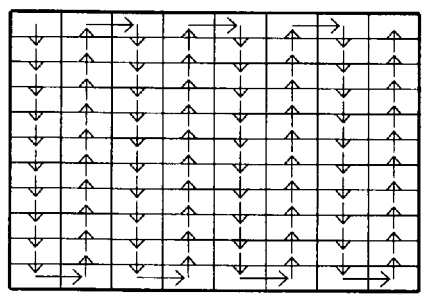
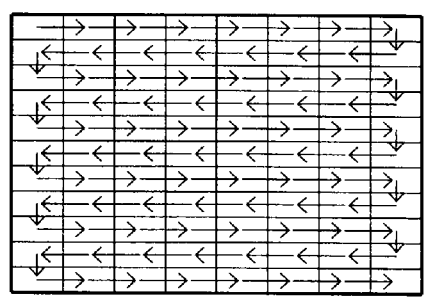
Fig. 8cFig. 8d

| 1, S2 | 0, S1 | 0, S9 | 1, S3 | 0, S4 | 1, S5 | 0, - | 0, - | 0, S6 | 1, S7 | 0, S8 | 1, S6 |

Fig. 11a

| P | (0,0) | (1,4) | (2,3) | (3,2) | (4,1) | P | (5,0) | (6,4) | (7,3) | (8,2) | (9,1) |
|---|---|---|---|---|---|---|---|---|---|---|---|
| (10,0) | (11,4) | (12,3) | (13,2) | (14,1) | (15,0) | (16,4) | (17,3) | (18,2) | (19,1) | (20,0) | (21,4) |
| (22,3) | (23,2) | (24,1) | (25,0) | (26,4) | (27,3) | (28,2) | (29,1) | (30,0) | (31,4) | (32,3) | (33,2) |
| (34,1) | (35,0) | (36,4) | (37,3) | (38,2) | (39,1) | (40,0) | (41,4) | (42,3) | (43,2) | (44,1) | (45,0) |
| (46,4) | (47,3) | (48,2) | P | (48,1) | (50,0) | (51,4) | (52,3) | (53,2) | P | (54,1) | (55,0) |
| (56,4) | (57,3) | (58,2) | (59,1) | (60,0) | (61,4) | (62,3) | (63,2) | (64,1) | (65,0) | (66,4) | (67,3) |
| (68,2) | (69,1) | (70,0) | (71,4) | (72,3) | (73,2) | (74,1) | (75,0) | (76,4) | (77,3) | (78,2) | (79,1) |

Fig. 11b

| P | (0,1) | (1,0) | (2,4) | (3,3) | (4,2) | P | (5,1) | (6,0) | (7,4) | (8,3) | (9,2) |
|---|---|---|---|---|---|---|---|---|---|---|---|
| (10,1) | (11,0) | (12,4) | (13,3) | (14,2) | (15,1) | (16,0) | (17,4) | (18,3) | (19,2) | (20,1) | (21,0) |
| (22,4) | (23,3) | (24,2) | (25,1) | (26,0) | (27,4) | (28,3) | (29,2) | (30,1) | (31,0) | (32,4) | (33,3) |
| (34,2) | (35,1) | (36,0) | (37,4) | (38,3) | (39,2) | (40,1) | (41,0) | (42,4) | (43,3) | (44,2) | (45,1) |
| (46,0) | (47,4) | (48,3) | P | (48,2) | (50,1) | (51,0) | (52,4) | (53,3) | P | (54,2) | (55,1) |
| (56,0) | (57,4) | (58,3) | (59,2) | (60,1) | (61,0) | (62,4) | (63,3) | (64,2) | (65,1) | (66,0) | (67,4) |
| (68,3) | (69,2) | (70,1) | (71,0) | (72,4) | (73,3) | (74,2) | (75,1) | (76,0) | (77,4) | (78,3) | (79,2) |

Fig. 11c

| P | (0,2) | (1,1) | (2,0) | (3,4) | (4,3) | P | (5,2) | (6,1) | (7,0) | (8,4) | (9,3) |
|---|---|---|---|---|---|---|---|---|---|---|---|
| (10,2) | (11,1) | (12,0) | (13,4) | (14,3) | (15,2) | (16,1) | (17,0) | (18,4) | (19,3) | (20,2) | (21,1) |
| (22,0) | (23,4) | (24,3) | (25,2) | (26,1) | (27,0) | (28,4) | (29,3) | (30,2) | (31,1) | (32,0) | (33,4) |
| (34,3) | (35,2) | (36,1) | (37,0) | (38,4) | (39,3) | (40,2) | (41,1) | (42,0) | (43,4) | (44,3) | (45,2) |
| (46,1) | (47,0) | (48,4) | P | (48,3) | (50,2) | (51,1) | (52,0) | (53,4) | P | (54,3) | (55,2) |
| (56,1) | (57,0) | (58,4) | (59,3) | (60,2) | (61,1) | (62,0) | (63,4) | (64,3) | (65,2) | (66,1) | (67,0) |
| (68,4) | (69,3) | (70,2) | (71,1) | (72,0) | (73,4) | (74,3) | (75,2) | (76,1) | (77,0) | (78,4) | (79,3) |

Fig. 11d

| P | (0,3) | (1,2) | (2,1) | (3,0) | (4,4) | P | (5,3) | (6,2) | (7,1) | (8,0) | (9,4) |
|---|---|---|---|---|---|---|---|---|---|---|---|
| (10,3) | (11,2) | (12,1) | (13,0) | (14,4) | (15,3) | (16,2) | (17,1) | (18,0) | (19,4) | (20,3) | (21,2) |
| (22,1) | (23,0) | (24,4) | (25,3) | (26,2) | (27,1) | (28,0) | (29,4) | (30,3) | (31,2) | (32,1) | (33,0) |
| (34,4) | (35,3) | (36,2) | (37,1) | (38,0) | (39,4) | (40,3) | (41,2) | (42,1) | (43,0) | (44,4) | (45,3) |
| (46,2) | (47,1) | (48,0) | P | (48,4) | (50,3) | (51,2) | (52,1) | (53,0) | P | (54,4) | (55,3) |
| (56,2) | (57,1) | (58,0) | (59,4) | (60,3) | (61,2) | (62,1) | (63,0) | (64,4) | (65,3) | (66,2) | (67,1) |
| (68,0) | (69,4) | (70,3) | (71,2) | (72,1) | (73,0) | (74,4) | (75,3) | (76,2) | (77,1) | (78,0) | (79,4) |

Fig. 11e

| P | (0,4) | (1,3) | (2,2) | (3,1) | (4,0) | P | (5,4) | (6,3) | (7,2) | (8,1) | (9,0) |
|---|---|---|---|---|---|---|---|---|---|---|---|
| (10,4) | (11,3) | (12,2) | (13,1) | (14,0) | (15,4) | (16,3) | (17,2) | (18,1) | (19,0) | (20,4) | (21,3) |
| (22,2) | (23,1) | (24,0) | (25,4) | (26,3) | (27,2) | (28,1) | (29,0) | (30,4) | (31,3) | (32,2) | (33,1) |
| (34,0) | (35,4) | (36,3) | (37,2) | (38,1) | (39,0) | (40,4) | (41,3) | (42,2) | (43,1) | (44,0) | (45,4) |
| (46,3) | (47,2) | (48,1) | P | (48,0) | (50,4) | (51,3) | (52,2) | (53,1) | P | (54,0) | (55,4) |
| (56,3) | (57,2) | (58,1) | (59,0) | (60,4) | (61,3) | (62,2) | (63,1) | (64,0) | (65,4) | (66,3) | (67,2) |
| (68,1) | (69,0) | (70,4) | (71,3) | (72,2) | (73,1) | (74,0) | (75,4) | (76,3) | (77,2) | (78,1) | (79,0) |

Fig. 11f

| P | P | P | P | S | S | P | P | P | P | S | S |
|---|---|---|---|---|---|---|---|---|---|---|---|
| S | S | S | S | S | S | S | S | S | S | S | S |
| (0,1) | (20,1) | (21,1) | (41,1) | (42,1) | (63,1) | (64,1) | (84,1) | (85,1) | (105,1) | (106,1) | (127,1) |
| (1,1) | (19,1) | (22,1) | (40,1) | (43,1) | (62,1) | (65,1) | (83,1) | (86,1) | (104,1) | (107,1) | (126,1) |
| P | (18,1) | (23,1) | P | (44,1) | (61,1) | P | (82,1) | (87,1) | P | (108,1) | (125,1) |
| (2,1) | (17,1) | (24,1) | (39,1) | (45,1) | (60,1) | (66,1) | (81,1) | (88,1) | (103,1) | (109,1) | (124,1) |
| (3,1) | (16,1) | (25,1) | (38,1) | (46,1) | (59,1) | (67,1) | (80,1) | (89,1) | (102,1) | (110,1) | (123,1) |
| P | (15,1) | (26,1) | P | P | P | P | (79,1) | (90,1) | P | P | P |
| (4,1) | (14,1) | (27,1) | (37,1) | (47,1) | (58,1) | (68,1) | (78,1) | (91,1) | (101,1) | (111,1) | (122,1) |
| (5,1) | (13,1) | (28,1) | (36,1) | (48,1) | (57,1) | (69,1) | (77,1) | (92,1) | (100,1) | (112,1) | (121,1) |
| (6,1) | (12,1) | (29,1) | (35,1) | (49,1) | (56,1) | (70,1) | (76,1) | (93,1) | (99,1) | (113,1) | (120,1) |
| P | (11,1) | (30,1) | P | (50,1) | (55,1) | P | (75,1) | (94,1) | P | (114,1) | (119,1) |
| (7,1) | (10,1) | (31,1) | (34,1) | (51,1) | (54,1) | (71,1) | (74,1) | (95,1) | (98,1) | (115,1) | (118,1) |
| (8,1) | (9,1) | (32,1) | (33,1) | (52,1) | (53,1) | (72,1) | (73,1) | (96,1) | (97,1) | (116,1) | (117,1) |

Fig. 12a

| P | P | P | P | S | S | P | P | P | P | S | S |
|---|---|---|---|---|---|---|---|---|---|---|---|
| S | S | S | S | S | S | S | S | S | S | S | S |
| (0,1) | (20,1) | (21,1) | (41,1) | (42,1) | (63,1) | (64,1) | (84,1) | (85,1) | (105,1) | (106,1) | (127,1) |
| (1,1) | (19,1) | (22,1) | (40,1) | (43,1) | (62,1) | (65,1) | (83,1) | (86,1) | (104,1) | (107,1) | (126,1) |
| P | (18,1) | (23,1) | P | (44,1) | (61,1) | P | (82,1) | (87,1) | P | (108,1) | (125,1) |
| (2,1) | (17,1) | (24,1) | (39,1) | (45,1) | (60,1) | (66,1) | (81,1) | (88,1) | (103,1) | (109,1) | (124,1) |
| (3,1) | (16,1) | (25,1) | (38,1) | (46,1) | (59,1) | (67,1) | (80,1) | (89,1) | (102,1) | (110,1) | (123,1) |
| P | (15,1) | (26,1) | P | P | P | P | (79,1) | (90,1) | P | P | P |
| (4,1) | (14,1) | (27,1) | (37,1) | (47,1) | (58,1) | (68,1) | (78,1) | (91,1) | (101,1) | (111,1) | (122,1) |
| (5,1) | (13,1) | (28,1) | (36,1) | (48,1) | (57,1) | (69,1) | (77,1) | (92,1) | (100,1) | (112,1) | (121,1) |
| (6,1) | (12,1) | (29,1) | (35,1) | (49,1) | (56,1) | (70,1) | (76,1) | (93,1) | (99,1) | (113,1) | (120,1) |
| P | (11,1) | (30,1) | P | (50,1) | (55,1) | P | (75,1) | (94,1) | P | (114,1) | (119,1) |
| (7,1) | (10,1) | (31,1) | (34,1) | (51,1) | (54,1) | (71,1) | (74,1) | (95,1) | (98,1) | (115,1) | (118,1) |
| (8,1) | (9,1) | (32,1) | (33,1) | (52,1) | (53,1) | (72,1) | (73,1) | (96,1) | (97,1) | (116,1) | (117,1) |

Fig. 12b

| P | P | P | P | S | S | P | P | P | P | S | S |
|---|---|---|---|---|---|---|---|---|---|---|---|
| S | S | S | S | S | S | S | S | S | S | S | S |
| (0,1) | (20,1) | (21,1) | (41,1) | (42,1) | (63,1) | (64,1) | (84,1) | (85,1) | (105,1) | (106,1) | (127,1) |
| (1,1) | (19,1) | (22,1) | (40,1) | (43,1) | (62,1) | (65,1) | (83,1) | (86,1) | (104,1) | (107,1) | (126,1) |
| P | (18,1) | (23,1) | P | (44,1) | (61,1) | P | (82,1) | (87,1) | P | (108,1) | (125,1) |
| (2,1) | (17,1) | (24,1) | (39,1) | (45,1) | (60,1) | (66,1) | (81,1) | (88,1) | (103,1) | (109,1) | (124,1) |
| (3,1) | (16,1) | (25,1) | (38,1) | (46,1) | (59,1) | (67,1) | (80,1) | (89,1) | (102,1) | (110,1) | (123,1) |
| P | (15,1) | (26,1) | P | P | P | P | (79,1) | (90,1) | P | P | P |
| (4,1) | (14,1) | (27,1) | (37,1) | (47,1) | (58,1) | (68,1) | (78,1) | (91,1) | (101,1) | (111,1) | (122,1) |
| (5,1) | (13,1) | (28,1) | (36,1) | (48,1) | (57,1) | (69,1) | (77,1) | (92,1) | (100,1) | (112,1) | (121,1) |
| (6,1) | (12,1) | (29,1) | (35,1) | (49,1) | (56,1) | (70,1) | (76,1) | (93,1) | (99,1) | (113,1) | (120,1) |
| P | (11,1) | (30,1) | P | (50,1) | (55,1) | P | (75,1) | (94,1) | P | (114,1) | (119,1) |
| (7,1) | (10,1) | (31,1) | (34,1) | (51,1) | (54,1) | (71,1) | (74,1) | (95,1) | (98,1) | (115,1) | (118,1) |
| (8,1) | (9,1) | (32,1) | (33,1) | (52,1) | (53,1) | (72,1) | (73,1) | (96,1) | (97,1) | (116,1) | (117,1) |

Fig. 12c

| P | P | P | P | S | S | P | P | P | P | S | S |
|---|---|---|---|---|---|---|---|---|---|---|---|
| S | S | S | S | S | S | S | S | S | S | S | S |
| (0,1) | (20,1) | (21,1) | (41,1) | (42,1) | (63,1) | (64,1) | (84,1) | (85,1) | (105,1) | (106,1) | (127,1) |
| (1,1) | (19,1) | (22,1) | (40,1) | (43,1) | (62,1) | (65,1) | (83,1) | (86,1) | (104,1) | (107,1) | (126,1) |
| P | (18,1) | (23,1) | P | (44,1) | (61,1) | P | (82,1) | (87,1) | P | (108,1) | (125,1) |
| (2,1) | (17,1) | (24,1) | (39,1) | (45,1) | (60,1) | (66,1) | (81,1) | (88,1) | (103,1) | (109,1) | (124,1) |
| (3,1) | (16,1) | (25,1) | (38,1) | (46,1) | (59,1) | (67,1) | (80,1) | (89,1) | (102,1) | (110,1) | (123,1) |
| P | (15,1) | (26,1) | P | P | P | P | (79,1) | (90,1) | P | P | P |
| (4,1) | (14,1) | (27,1) | (37,1) | (47,1) | (58,1) | (68,1) | (78,1) | (91,1) | (101,1) | (111,1) | (122,1) |
| (5,1) | (13,1) | (28,1) | (36,1) | (48,1) | (57,1) | (69,1) | (77,1) | (92,1) | (100,1) | (112,1) | (121,1) |
| (6,1) | (12,1) | (29,1) | (35,1) | (49,1) | (56,1) | (70,1) | (76,1) | (93,1) | (99,1) | (113,1) | (120,1) |
| P | (11,1) | (30,1) | P | (50,1) | (55,1) | P | (75,1) | (94,1) | P | (114,1) | (119,1) |
| (7,1) | (10,1) | (31,1) | (34,1) | (51,1) | (54,1) | (71,1) | (74,1) | (95,1) | (98,1) | (115,1) | (118,1) |
| (8,1) | (9,1) | (32,1) | (33,1) | (52,1) | (53,1) | (72,1) | (73,1) | (96,1) | (97,1) | (116,1) | (117,1) |

Fig. 12d

METHOD OF DATA TRANSMISSION IN A MULTI-CARRIER BASED TRANSMISSION SYSTEM AND DEVICE IMPLEMENTING THE METHOD

BRIEF SUMMARY OF THE INVENTION

The invention concerns multi-carrier based digital telecommunication systems where the channel is used to transport several data streams according to the frequency division multiple access scheme (FDMA). The different data streams originate from at least one source and/or are addressed to at least one destination. Typical examples are multi-user radiomobile cellular systems where the channel is shared between several users and where each user may possibly receive several services. Another application is broadcasting, e.g. for audio or video signals where several programs are often transmitted on the same channel. Data associated to the different users, services, programs, etc. are described as logical streams in the sequel. The invention is, more particularly, about the mapping of data on the physical resource used for the transmission.

FIG. 1 illustrates the architecture of the radio resource channel over the time 1.1. A channel is constituted by a band of frequency 1.5. In such transmission schemes the channel 1.5 is divided into a number '$N_{PSB}$' of physical sub-bands, PSB, 1.4. We consider particularly systems where data is transmitted by bursts of several multi-carrier symbols with variable length or systems where transmission time is divided into a number of time slots made of a constant number of symbols except for some specific slots like, for example, uplink-downlink switching points. More generally, it is considered that data is transmitted as packets mapped onto a given number 'N' of consecutive multi-carrier symbols. The number N of consecutive multi-carrier symbols is described in the sequel as the transmission interval 1.3. The transmission interval may correspond to a burst, a slot, a sub-frame, a frame, a transmission time interval (TTI) duration, or any other duration related to a transmission system. The decomposition of the channel into physical sub-bands 1.4 over each transmission interval 1.3 leads to the definition of $N_{PRB}=N_{PSB}$ physical resource blocks, called PRB, under reference 1.2. The number of sub-bands in the channel may possibly be different over each transmission interval.

In such systems, the physical layer that is responsible for the actual transmission of information onto the physical medium receives data from the upper layers as packets of bits usually called protocol data units, PDUs. The number of bits in a PDU is such that after relevant encoding the resulting number of modulation symbols matches the number of available sub-carriers in the allocated resources. Depending on the context, a PDU can carry data associated to one or several logical streams. For example, a PDU can carry data associated to one or several services of a specific user in a cellular radiomobile system. For generality, a PDU is said associated to a physical stream, or more simply a stream. A PDU can be allocated onto several PRBs over a given duration that is often related to the TTI. The proposed invention deals with the mapping of modulation symbols resulting of the encoding of PDUs onto one or several PRBs over a transmission interval. It is supposed that data resulting of the PDUs encoding is segmented into a number of block data units denoted BDUs corresponding to the number of PRBs allocated to the PDU. The proposed invention is described as a solution for mapping BDUs onto PRBs.

Over each transmission interval, the modulation symbols, under reference 1.8, resulting of the encoding process of each physical stream are mapped onto one or several PRBs 1.2. Each symbol is transmitted on a particular sub-carrier 1.6 during the symbol time 1.7. Each PRB 1.2 is made of R=M×N modulation symbols 1.8 available for transmission, where N is the number of multi-carrier symbols and M is the number of sub-carriers constituting the PRB. The size of the PRB associated to the different transmission modes defines the number of bits also called payload size required to build a BDU over a transmission interval 1.3.

As mentioned above, a typical application of the invention are the cellular radiomobile systems where the access to the medium is controlled in a centralized manner, e.g. by a base station. One of the key issues for this kind of systems is to allocate the different streams onto the PRBs so as to optimise the overall system performance (spectral efficiency, BER and PER, power consumption, interference level, or any other performance metric relative to the system) while maintaining the complexity of the system at a reasonable level. When dealing with systems with a dynamic or semi-static allocation of data onto PRBs, it is also important to reduce as much as possible the amount of signaling required to inform the receivers about the position and destination of allocated PRBs. If the PRB bandwidth is well below the channel coherence bandwidth, this allocation can be done by allocating each stream to one or several PRBs for which the channel quality is compatible with the expected level of performance (e.g. flat fading with good signal to noise ratio over the whole sub-band). This allocation strategy is described in terms of 'localized' transmission as the stream is transmitted onto blocks of consecutive sub-carriers. In case of systems with a reverse transmission link, the allocation may be established using some channel quality indication (CQI) evaluated by the receiving terminal and sent back to the transmitting site. This approach applies as long as the CQI information is still reliable when received at the transmitting site. If the terminal velocity is too high, at the time the transmitting site receives the last CQI measure, the channel may have changed significantly, thus preventing the selection of the most appropriate allocation. In that case, a solution is to map each stream onto a given set of scattered non-consecutive sub-carriers so as to benefit from some channel diversity in the frequency domain. This allocation is commonly described as 'distributed'. The distributed mode can also be applied in the case of broadcasting systems where the same programs can possibly be decoded by many different receivers.

Two main approaches can be contemplated to handle distributed transmissions. The first one is described as operating at the sub-carrier level. In those schemes, distributed data is inserted within localized data e.g. by puncturing of the corresponding symbols. The invention belongs to a second class of methods where a given number $N_{D\text{-}PRB}$ of PRBs is dedicated to distributed transmission in a block-wise approach. For block-wise solutions, the transmit bandwidth is structured into a combination of sub-bands dedicated to either localized or distributed transmissions. The multiplexing of localized and distributed transmissions within the transmit bandwidth is accomplished by frequency division multiplexing (FDM). The number of PRBs devoted to localized traffic is denoted as $N_{L\text{-}PRB}$ and the number of PRBs devoted to distributed traffic is denoted as $N_{D\text{-}PRB}$ where $N_{L\text{-}PRB}+N_{D\text{-}PRB}=N_{PRB}$ the total number of PRBs in the channel. This document proposes a new method for achieving the mapping of distributed transmissions. The scheme of the mapping adopted to allocate streams onto, and within, the distributed PRBs will influence the different level of performance achieved for each stream and therefore of the overall transmission.

Some mappings have been proposed previously in the frame of cellular radiomobile systems. A first mapping is described in: <<3GPP-LTE R1-061182, "Distributed FDMA transmission for shared data channel in E-UTRA downlink", NTT DoCoMo, Ericsson, Fujitsu, Mitsubishi Electric, Motorola, NEC, Nokia, Panasonic, Sharp, Toshiba Corporation, Ericsson>>. It is based on a division of PRBs into slices composed by one or several sub-carriers of the PRB. The allocation is the same for all PRBs. As it is described, this proposition offers a solution for a limited number of streams. Depending on the localisation of signaling symbols within the PRBs, it could introduce disparities in the available payload usable by the different streams according to the mapping choice. Moreover, in case of deep fading occurring on some sub-carriers, the degradation will affect different streams unevenly.

A second mapping have been proposed in: <<3GPP-LTE R1-060095, "E-UTRA DL-Localized and distributed transmission", Ericsson>>. While overcoming the disparities problem between streams, this proposition as it is described, based on a mapping on slices of constant size and modulo allocation, still contemplates a solution for a limited number of streams. Moreover this solution exhibits the same deep fading effect.

It is advantageous that disparities in channel conditions affect as evenly as possible the different streams. It is also advantageous to allow easy switching between localized and distributed modes for a given stream depending of the ability for the system to get accurate information on the quality of the transmission, while keeping a simple implementation and limited amount of signaling required to indicate to the receiving ends the allocation and destination of streams transmitted in distributed mode.

To overcome these problems the invention proposes a method of mapping data on physical resource in a transmission system where data of elementary streams is distributed over several physical resource blocks, and within each resource block in order to get data from a plurality of elementary streams on at least one sub-carrier and at least a symbol time of each physical resource block.

Such a mapping achieves a good diversity of the allocation of the different streams, leading to the advantage, among others, that poor transmission conditions affecting a particular sub-carrier or a particular time duration, will not concentrate its effects on a particular stream.

In some embodiments of the invention we get the secondary advantage of being compatible with a simplified signaling approach with a reduced overhead when compared with signaling for localized traffic.

In some embodiments of the invention we get the advantage of having a payload size independent of the allocation and equal between streams, thus simplifying the traffic scheduling and allowing a smooth switch between localized and distributed modes.

In some embodiments of the invention we get the advantage of being compatible with a dynamic modification in the number and the position of the distributed PRBs.

In some embodiments of the invention we get the advantage of benefiting of a low implementation overhead for systems that support localized transmission.

In some embodiments of the invention we get the advantage of keeping a regularity among distributed data even for PRBs with an irregular structure due for example to reference symbols.

In some embodiments of the invention we get the advantage of allowing mapping of group of symbols if required by specific transmission schemes.

In some embodiments of the invention, we get the advantage of being compatible with simple solutions for reducing inter-cell interference between distributed streams in cellular systems.

The invention concerns a method of data transmission in a multi-carrier based transmission system, the transmission being made over a channel shared among a number of data streams according to a frequency division multiple access scheme, data from different sources or to different destinations being sent by streams of symbols, the physical resource blocks being defined as blocks constituted by a given number of consecutive sub-carriers and a transmission time of a given number of symbol durations, some of these streams being transmitted in a distributed mode, comprising a distributed allocation step of some other distributed streams onto at least one distributed physical resource block in a second distributed mode, and in wherein the distributed allocation step comprises a spreading step of the symbols of the distributed streams onto and within the distributed physical resource blocks in a way where each sub-carrier and each symbol time of the distributed physical resource blocks will be allocated with symbols from at least two different streams.

According to a particular embodiment of the invention, the spreading step comprises a multiplexing step of symbols from a first plurality of L data blocks, fed with symbols from the distributed streams, to a second plurality of L data blocks to be allocated to physical resource blocks.

According to a particular embodiment of the invention, each data block of the first and second plurality being of size S and being indexed from 0 to S−1, each plurality being indexed from 0 to L−1, each symbol of rank i of the data block of rank j of the first plurality is multiplexed to the symbol of rank k=i of the data block of rank l=(i+j) mod L of the second plurality.

According to a particular embodiment of the invention, each data block of the first and second plurality being of size S and being indexed from 0 to S−1, each plurality being indexed from 0 to L−1, L being a sub-multiple of S, each symbol of rank i of the data block of rank j of the first plurality is multiplexed to the symbol of rank k=(i+j) mod L+[i/L]*L of the data block of rank l=i mod L of the second plurality.

According to a particular embodiment of the invention, each data block of the first and second plurality being of size S and being indexed from 0 to S−1, each plurality being indexed from 0 to L−1, L being a sub-multiple of S, each symbol of rank i of the data block of rank j of the first plurality is multiplexed to the symbol of rank k=(i+j) mod S of the data block of rank l=i mod L of the second plurality.

According to a particular embodiment of the invention, each data block of the first and second plurality being of size S and being indexed from 0 to S−1, each plurality being indexed from 0 to L−1, L being a sub-multiple of S, s being chosen between 1 and L inclusive, each symbol of rank i of the data block of rank j of the first plurality is multiplexed to the symbol of rank k=i of the data block of rank l=(i+j+s) mod L of the second plurality.

According to a particular embodiment of the invention, said transmission system being cellular, the s parameter is dependent of the cell in which the method is used.

According to a particular embodiment of the invention, the method further comprises a final allocation step of the symbols of the second plurality of data blocks to the physical resource blocks.

According to a particular embodiment of the invention, the size S of the data blocks being chosen equal to the size of the physical resource blocks, each symbol of each data block of the second plurality is allocated to the symbol of same rank in a corresponding physical resource block.

According to a particular embodiment of the invention, some symbols in the physical resource blocks being forbidden, the symbols allocated to these forbidden symbols are punctured.

According to a particular embodiment of the invention, some symbols in the physical resource block being forbidden, S being chosen equal to the number of available symbols in the resource blocks, each symbol of each data block of the second plurality is allocated to the symbol of same rank in the subset constituted by the available symbols of a corresponding physical resource block.

According to a particular embodiment of the invention, some symbols in the physical resource block being forbidden, S being chosen greater to the number of available symbols in the resource blocks and lower or equal to the total number of symbols of the resource blocks, each symbol of each data block of the second plurality is allocated to the symbol of same rank in a corresponding physical resource block, symbols allocated to forbidden symbols being punctured.

According to a particular embodiment of the invention, some symbols in the physical resource blocks being forbidden, the number and/or the position of the forbidden symbols being variable within the physical resource blocks, S being chosen greater to the minimum number of available symbols in the resource blocks and lower or equal to the total number of symbols of the resource blocks, each symbol of each data block of the second plurality is allocated uniformly to the symbol of same rank in a corresponding physical resource block, the rank being defined uniformly on a subset of symbols of the physical resource blocks, symbols allocated to forbidden symbols being punctured.

According to a particular embodiment of the invention, some symbols in the physical resource blocks being forbidden, the number and/or the position of the forbidden symbols being variable within the physical resource blocks, S being chosen greater to the minimum number of available symbols in the resource blocks and lower or equal to the total number of symbols of the resource blocks, each symbol of each data block of the second plurality is allocated uniformly to the symbol of same rank in a corresponding physical resource block, the rank being defined uniformly on a subset of symbols of the physical resource blocks, symbols allocated to forbidden symbols being allocated to non allocated available symbols.

According to a particular embodiment of the invention, the method further comprises a first allocation step of symbols from the different streams in the first plurality of data blocks.

According to a particular embodiment of the invention, symbols from the different streams are directly allocated into the physical resource blocks at the exact place defined as described above.

The invention also concerns a data transmission device in a multi-carrier based transmission system, the transmission being made over a channel shared among a number of data streams according to a frequency division multiple access scheme, data from different sources or to different destinations being sent by streams of symbols, the physical resource blocks being defined as blocks constituted by a given number of consecutive sub-carriers and a transmission time of a given number of symbol durations, some of these streams being transmitted in a distributed mode, comprising distributed allocation means to allocate some other distributed streams onto at least one distributed physical resource block in a second distributed mode, and wherein the distributed allocation means comprises spreading means to spread the symbols of the distributed streams onto and within the distributed physical resource blocks in a way where each sub-carrier and each symbol time of the distributed physical resource blocks will be allocated with symbols from at least two different streams.

According to a particular embodiment of the invention, the spreading means are adapted to implement the method as describe above.

The characteristics of the invention will emerge more clearly from a reading of the following description of an example embodiment, the said description being produced with reference to the accompanying drawings, among which:

BRIEF DESCRIPTION OF THE DRAWINGS

FIG. 2 presents an allocation according to a known method.

FIG. 3 presents an example of table based signaling.

FIG. 8 presents some different PRB mapping schemes.

FIG. 11 displays a first application of different embodiments of the invention in the scope of the 3GPP-LTE system.

FIG. 12 displays a second application of different embodiments of the invention in the scope of the 3GPP-LTE system.

DETAILED DESCRIPTION OF THE INVENTION

Figure 1:
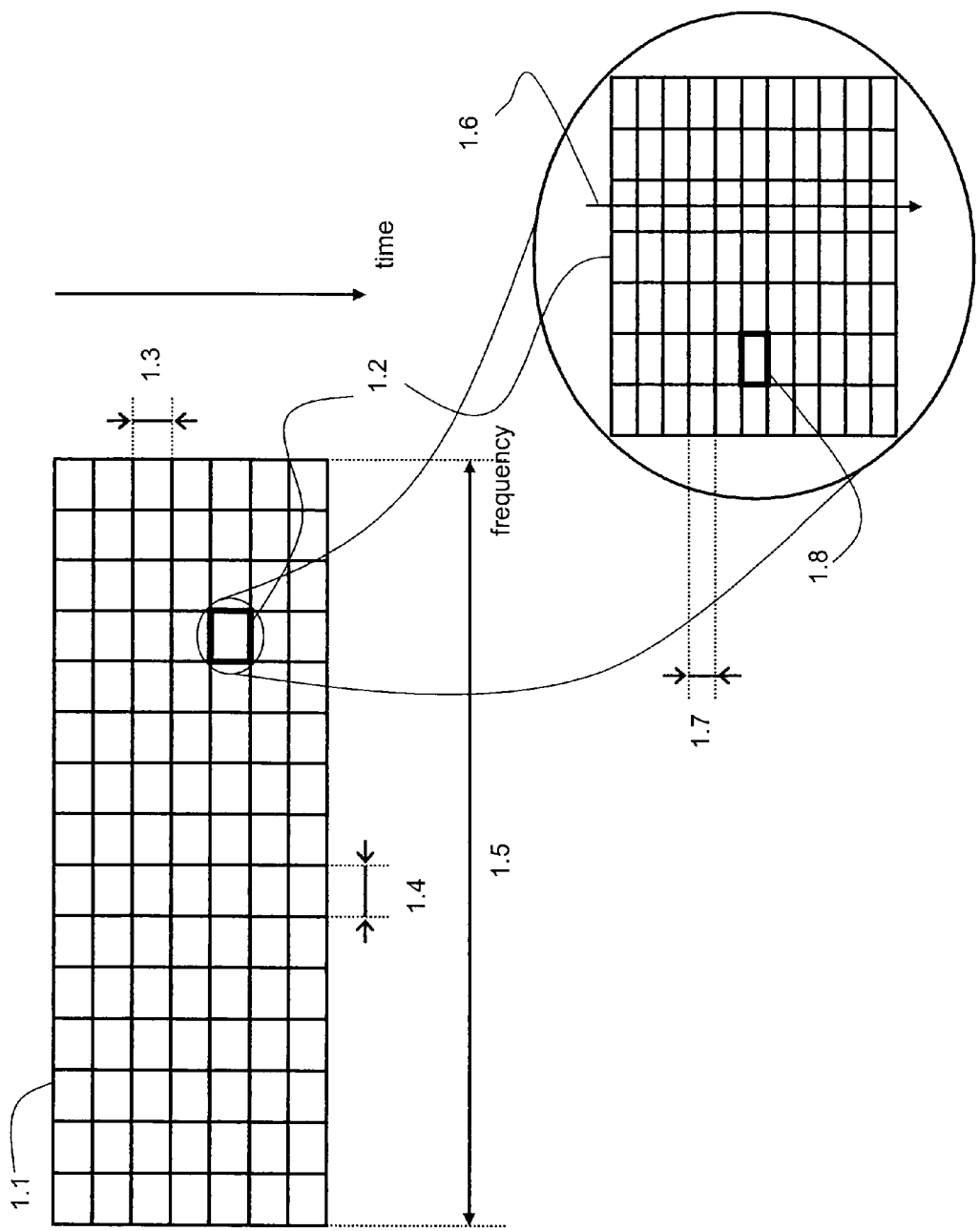
FIG. 1 illustrates the architecture of the radio resource channel over the time.

As mentioned above, distributed transmission is mainly needed in a context of mobility, typically for radio mobile systems. It is more generally useful for that systems that get a benefit from exploiting some channel diversity in the frequency domain. Some of these systems rely on the OFDMA technique, combination of OFDM for the robustness to channel degradations and the FDMA access scheme for multiple access. The issue is to allocate the different streams onto the distributed PRBs. The existing techniques, like those described in <<3GPP-LTE R1-061182, "Distributed FDMA transmission for shared data channel in E-UTRA downlink", NTT DoCoMo, Ericsson, Fujitsu, Mitsubishi Electric, Motorola, NEC, Nokia, Panasonic, Sharp, Toshiba Corporation, Ericsson>>, propose to divide the PRBs into slices either in the time or the frequency domain. More generally, those slices can be made as a plurality of contiguous sub-carriers.

A basic method consists in allocating the same slice within all the distributed PRBs to a given stream. FIG. 2 illustrates this solution where three streams, $S_i$ referenced 2.1, $S_k$ referenced 2.2 and $S_l$ referenced 2.3 are allocated onto the same set of sub-carriers within each of three distributed PRBs. If the distributed PRBs are spread over the whole bandwidth, this scheme allows benefiting from a good diversity. However, in case of mapping within a reduced number of PRBs (e.g. for channels below 2.5 MHz in 3GPP-LTE systems), the allocation in the frequency domain may lead to performance degradation when a given frequency slice is affected by a deep fade within a PRB.

Signaling for stream allocation appears as a key issue in multi-user cellular systems. It is more generally needed to signal the receiver with the allocation of the different streams in order to allow for the decoding of the appropriate information. In the case of localized transmissions, at least two common approaches are envisaged. The first one described as "table-based" consists in transmitting a table where each element of the table corresponds to a PRB in the channel where PRBs are described for example from the left-hand side to the right-hand side of the multiplex. For all allocated PRBs, the corresponding entry contains at least a stream identifier. In this case, the number of signaling bits remains the same whatever the number of allocated PRBs. In the second approach, signaling is made of a table with a number of entries equal to the number of allocated PRBs in the current signaling period. Each entry contains a stream identifier and a binary word with length equal to the number of PRBs in the channel where each position occupied by the stream is set for instance to 1 and 0 elsewhere. In the case of distributed transmissions, the signaling may rapidly increase depending on the way streams are allocated onto distributed PRBs. A very convenient approach is to make the number K of streams transmitted as distributed mode equal (or lower) to the number $N_{D-PRB}$ of distributed PRBs. The allocation of distributed streams, e.g. streams to be transmitted using distributed PRBs, can then be achieved just as for localized streams, e.g. streams to be transmitted using localized PRBs, where the stream allocated to the first distributed PRB occupies the first slice in each distributed PRB and so on. Using such convention, it is only required to indicate the position of the distributed PRBs in addition of the standard signaling for localized traffic. To simplify the description of such solutions, it is common to introduce the concept of virtual resource block denoted VRB. The number of VRBs in the channel is equal to the number of PRBs. Each stream is being allocated one or several VRBs onto each transmission interval. When a stream is allocated onto a VRB corresponding to the position of localized PRB, or a localized VRB denoted L-VRB, the stream is transmitted in localized mode in the PRB of same position. When a stream is allocated onto a VRB corresponding to the position of distributed PRB or a distributed VRB denoted D-VRB, the stream is transmitted in distributed mode where the positions occupied by the stream in each D-PRB is defined by the rank of the D-PRB among all D-PRBs in the channel. This approach is illustrated on FIG. 3 in the case of the table-based technique. This figure correspond to the signaling table of the mapping illustrated FIG. 2, where $S_m$, $S_n$ and $S_o$ are localized streams.

However, the combination of this approach with the segmentation of the PRBs into slices limits the number of streams that can be allocated into the distributed PRBs to the number M of sub-carriers in a PRB. As for the proposed invention, this method can be extended to support the mapping of any number of streams equal to the number of D-PRBs while keeping the same signaling approach. But, if the number of streams exceeds the number M, then all the streams will not be mapped within the same set of D-PRBs thus leading to an unequal diversity gain between streams. In addition, to obtain an equal diversity between streams, the number of D-PRBs can only be selected as a sub-multiple of M. Then all streams occupy the same number of positions within each D-PRB. To obtain a finer granularity, the size of the slices within the different D-PRBs must be selected unequal, thus leading to an unequal diversity gain.

Figure 4A:
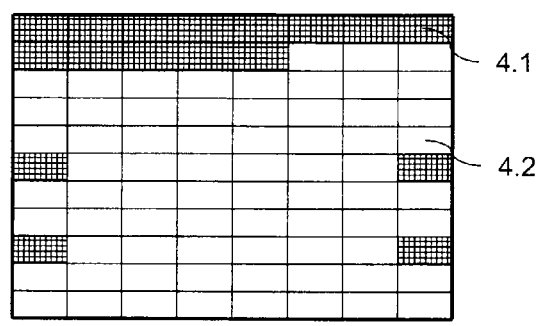
FIG. 4 presents some allocation example in PRBs containing forbidden symbols in the prior art.
Figure 4B:
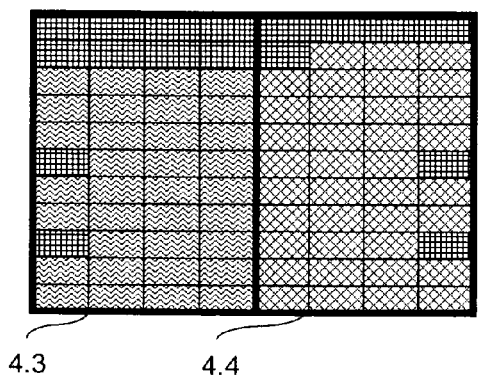
Figure 4C:
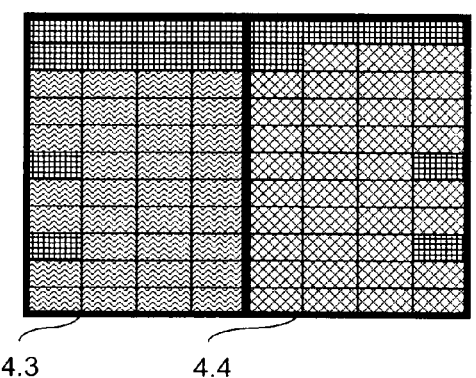

PRBs may contain symbols positions dedicated to reference pilots or signaling as shown on FIG. 4a. These symbols or sub-carrier positions are called hereafter forbidden symbols, referenced 4.1. Symbols free to be used for the actual data transmission are referenced 4.2. If the forbidden symbols are not equally spread within the different slices, the number of symbols available for a given stream may not the same depending on the allocation. This requires the system to handle different PDU and BDU sizes depending on the position of the stream into the PRB. This is illustrated by FIG. 4b and FIG. 4c for the solution with mapping a BDU in always the same slice. On these figures one can see that the stream $S_i$, referenced 4.3, gets a total number of 68 symbols. Stream $S_k$, referenced 4.4, gets a total number of 74 symbols Another solution consists in using a constant size and puncturing the symbols that should have been mapped onto the positions of the forbidden symbols. This solution also known as rate matching is flexible but may lead to a different level of performance depending on the allocation of the stream.

Figure 5:
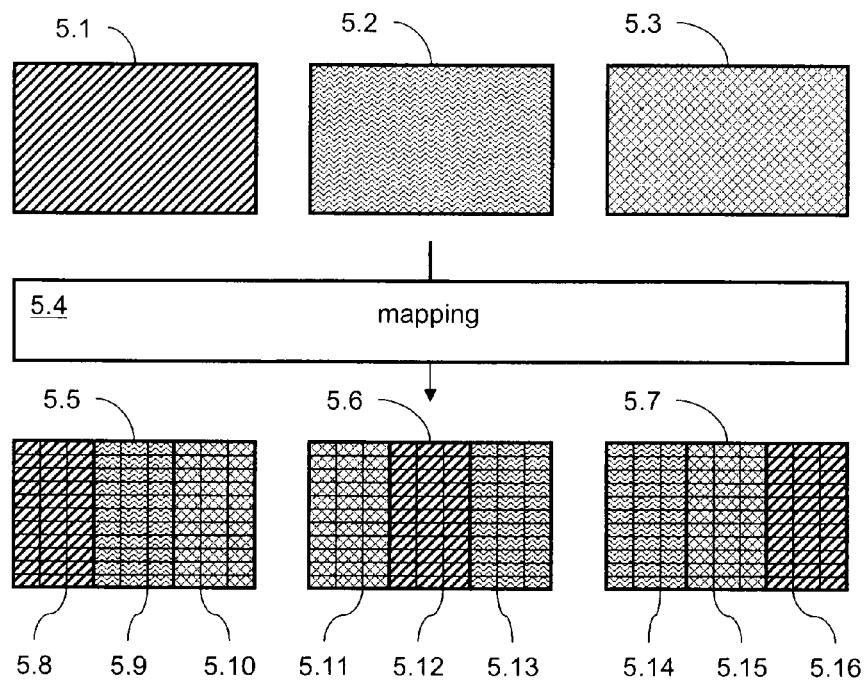
FIG. 5 presents an allocation scheme according to prior art.

The method proposed in <<3GPP-LTE R1-060095, "E-UTRA DL-Localized and distributed transmission", Ericsson>> can be devised so as to overcome this issue. In this solution, each of the $N_{D-PRB}$ D-PRBs is divided into $N_{D-PRB}$ slices with the same number of sub-carriers. The difference with the previously mentioned approach is the way streams are mapped within the slices. Instead of being allocated to the same slice within each PRB, the position of each stream is shifted of one slice when switching to the following PRB. As shown on FIG. 5, the shift is achieved according to a modulo operation in order to keep all streams within the D-PRBs. On this figure, one can see three streams 5.1, 5.2, 5.3 which are to be mapped on three PRBs 5.5, 5.6 and 5.7 by the mapping operation 5.4. First stream 5.1 is mapped on the first slice 5.8 of the first PRB 5.5, on the second slice 5.12 of second PRB 5.6 and on third slice 5.16 of third PRB 5.7. Second stream 5.2 is mapped on the second slice 5.9 of the first PRB 5.5, on the third slice 5.13 of the second PRB 5.6 and on first slice 5.14 of the third PRB 5.7 third stream 5.3 is mapped on the third slice 5.10 of the first PRB 5.5, on the first slice 5.11 of the second PRB 5.6 and on second slice 5.15 of the third PRB 5.7.

It is still possible to maintain the simplified signaling for the allocation of the streams onto the PRBs. In the case of the "table-based" approach, the position of the stream identifier onto the distributed PRBs indicates in which PRB the first slice of the stream is mapped onto the first slice of the D-PRB. Thanks to this approach, each stream occupies all the positions of a PRB. As long as all distributed PRBs share the same pattern of forbidden symbols, all streams occupy the same number of symbols. The BDU size is therefore independent of the position of the stream in the first D-PRB. As the BDU size is the same for a localized and a distributed allocation, it is possible to switch a transmission between the two modes depending on the channel conditions easily.

In order to optimise the spectral efficiency, pilots dedicated to channel estimation may not be inserted on all sub-carriers but only on a sub-set of equally spaced sub-carriers. In this case, the precision on the channel estimation used for demodulation may depend on the position of the sub-carrier in the frequency domain. Using the aforementioned approach, each stream 'sees' all frequencies within a PRB. If the pilots are equally spread within all PRBs, then all streams globally suffer from the same degradation in terms of channel estimation error. However, this approach still limits to M the number of supported streams within a set of PRBs under the constraint of having the same diversity gain for all streams. In addition, as the previous solution, if a PRB suffers of a deep fade on a set of sub-carriers, performance may be significantly degraded in case of distribution onto a reduced set of PRBs.

Figure 6:
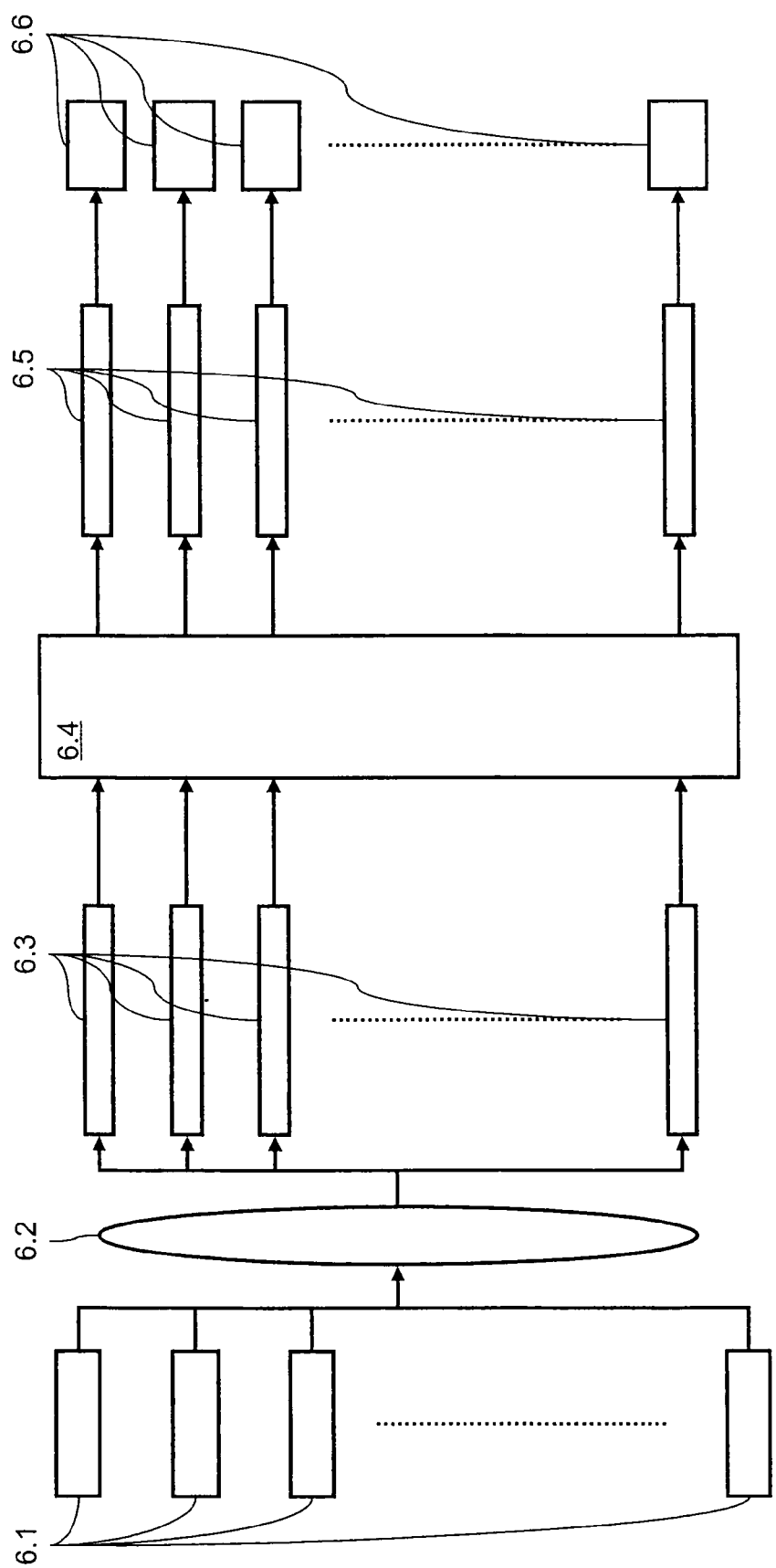
FIG. 6 presents the general architecture of an embodiment of the invention.

The invention will now be described in the context described above. FIG. 6 gives the global architecture of the proposed mapping operation. Over each transmission interval, modulation symbols resulting from the encoding of PDUs 6.1 are allocated 6.2 by segmentation and possible padding into packets called Block Data Units (BDU) 6.3 to be mapped within D-PRBs 6.6. Let's first consider that PRBs do not contain forbidden symbols. Each BDU 6.3 is made of a number S of M-ary symbols with S≦R where R=M×N is the maximum number of positions available for transmission in a PRB consisting of M sub-carriers and N symbol times. The number $N_{D-PRB}$ of distributed PRBs is chosen equal to a number L where $L \leq N_{PRB}$. The invention achieves the distributed mapping of K≦L BDUs 6.3 within the set of L distributed PRBs 6.6. To keep generality, it is supposed that the the L-K remaining allocations are fed with null BDUs identified as such. The set of L BDUs to be distributed are numbered from 0 to L-1. The first allocation 6.2 of the different streams onto the L BDUs is achieved according to any appropriate method, for example on the first block and so on. Within each BDU, symbols are numbered from 0 to S-1. Mapping of BDUs can be viewed as achieved in two steps. First, the symbols of the different BDUs are multiplexed 6.4 together to form a new set of L packets of symbols called distributed BDUs 6.5, which will be noted D-BDUs. The goal of this multiplexing is to spread the data of one BDU 6.3 on distributed BDUs 6.5 with a large diversity. Then, each D-BDU is mapped onto an actual D-PRB for transmission. The final allocation of the D-BDUs onto the D-PRBs can be achieved according to any appropriate law such a simply mapping the first D-BDU onto the first D-PRB (lowest frequency) and so on. The description of the method as a two-step procedure is applied for clarity. Both operations can easily be performed together using a direct computation of the destination of the symbol in the D-PRB from the BDU.

Three embodiments of the invention are described based each on a different multiplexing law used in the multiplexing step. Identifying a data within a BDU by its indexes (i, j) where i from 0 to S-1 represents its rank within a BDU and where j from 0 to L-1 represents the rank of the BDU. Identifying a data within a D-BDU by its indexes (k, l) where k from 0 to S-1 represents its rank within a D-BDU and where l from 0 to L-1 represents the rank of the BDU.

A first embodiment is based on a multiplexing law where data of index (i, j) in a BDU is placed in D-BDUs at index (k, l) where:

$k=i$; and $l=(i+j) \bmod L$.

A second embodiment is based, in the case where L is a sub-multiple of S, on a multiplexing law where data of index (i, j) in a BDU is placed in D-BDUs at index (k, l) where $k=(i+j) \bmod L + \lfloor i/L \rfloor * L$; and $l=i \bmod L$.

A third embodiment is based in the case where L is a sub-multiple of S, on a multiplexing law where data of index (i, j) in a BDU is placed in D-BDUs at index (k, l) where $k=(i+j) \bmod S$; and $l=i \bmod L$.

Figure 7A:
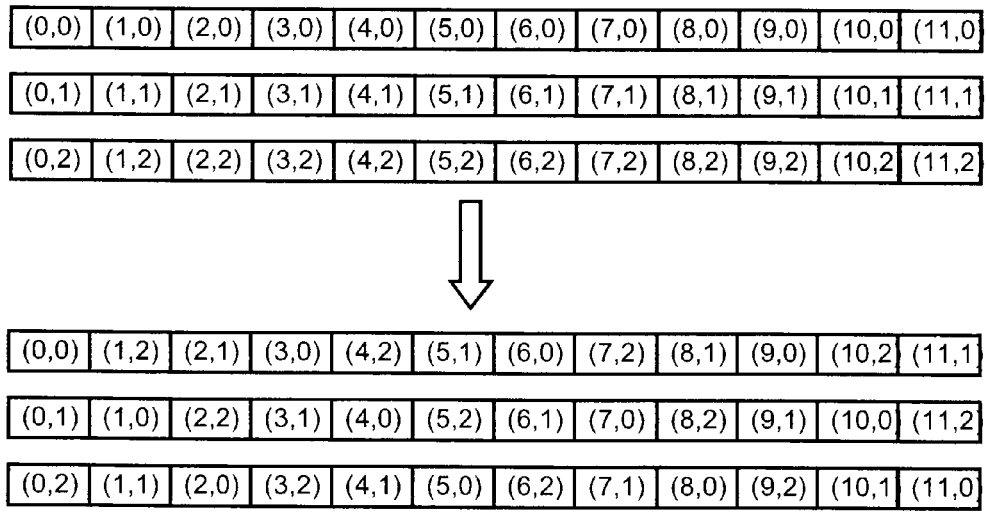
FIG. 7 presents some examples of different embodiments of the invention.

In the first embodiment, the initial symbol of the BDU of rank j is mapped within the D-PDU of rank j while in the second and third embodiments, it is always mapped in the first D-BDU. FIG. 7 illustrates the multiplexing laws with L=3 and S=12, FIG. 7a illustrates the first embodiment, FIG. 7b the second one and FIG. 7c the third one. The embodiments of the invention use a direct allocation where first D-BDU is allocated to the first D-PRB, the second D-BDU to the second D-PRB and so on. In addition, the symbols of each D-BDU can be mapped within the 2D-array of the allocated D-PRB according to any law. FIG. 8 illustrates typical examples which are linear or snake mapping in time or frequency. FIG. 8a corresponds to a linear mapping in time, FIG. 8b corresponds to a linear mapping in frequency, FIG. 8c corresponds to a snake mapping in time and FIG. 8d to a snake mapping in frequency. In the first embodiment, the number of D-PRBs can be set at any value L where $L \leq N_{D-PRB}$ even greater than R the maximum number of available positions within a PRB. This provides an additional flexibility but in this case, all BDUs are not mapped in all D-PRBs, thus leading to an unequal diversity gain. As long as L is lower than R, then all BDUs occupy some positions within all D-PRBs, but not necessarily the same number. This can be obtained by selecting L as a sub-multiple of S. One advantage of the proposed approach is to allow for a much greater number of solutions for the number of D-PRBs as R is often greater than M. Another advantage results from the mapping achieved at the modulation symbol level, thus leading to an increased diversity gain.

We will now present how to handle the mapping within PRBs that contain forbidden symbols. Let's consider in a first approach the case where all D-PRBs share the same pattern of a given number $N_{FS}$ of forbidden symbols. The issue is that this number may vary either semi-statically, it will for example be relative to the number of reference symbols which depends on the number of transmit antennas on the base station or dynamically from time interval to time interval. In these conditions, the parameter S can be set in different ways. First, it can be chosen equal to the exact number of actually available symbols in a PRB taking into account the effective number of forbidden symbols. This approach optimizes the usage of the spectral resources but requires handling several block sizes. Another approach is to set S equal to a fixed value independent of the effective number of available symbols. If the number of effective available symbols is below this value, data corresponding to the positions of the reference symbols can simply be punctured. On the other hand, if the number of effective available positions is greater than S, the remaining positions can be either modulated to zero or used to carry on other kind of traffic. This mainly leads to three different situations depending on the effective number of forbidden symbols $N_{FS}$, the maximum number of forbidden symbols $N_{FSmax}$ and the minimum number of forbidden symbols $N_{FSmin}$.

If the size of BDUs S is chosen greater than $R-N_{FS}$, then the D-BDU contains more symbols to be mapped than available positions within the D-PRB. Some symbols have to be punctured. This is always the case when S is chosen greater than $R-N_{FSmin}$.

If the size of BDUs S is chosen lower than $R-N_{FS}$, then the D-BDU contains less symbols to be mapped than available positions within the D-PRB, thus leaving unused positions. These positions can be set to a void value or used to carry on other kind of traffic. This is always the case when S is chosen lower than $R-N_{FSmax}$.

If the size of BDUs S is chosen equal to $R-N_{FS}$, then the D-BDU contains exactly the same number of symbols to be mapped than available positions within the D-PRB. No puncturing is needed and no void position is generated.

Figure 9:
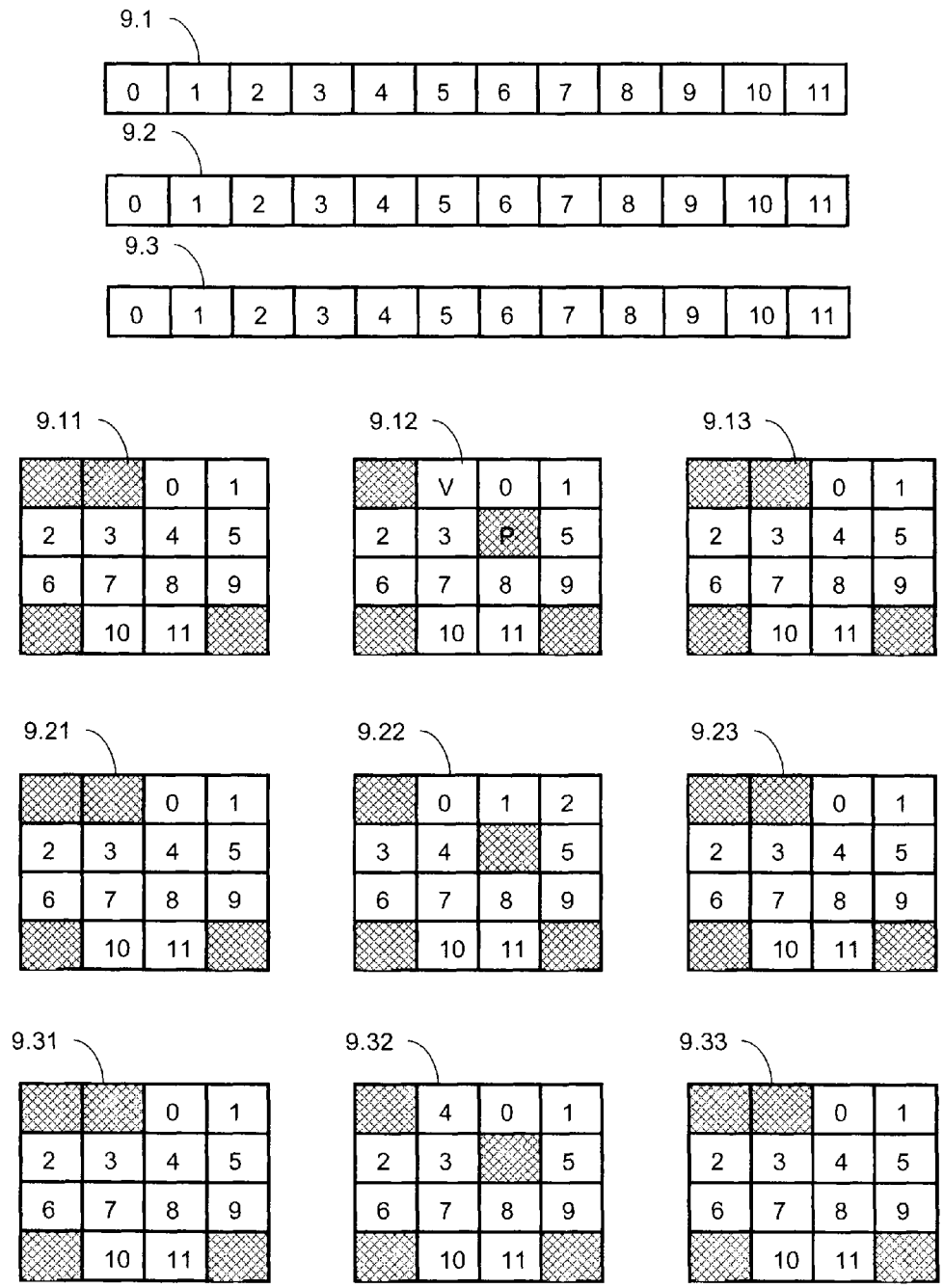
FIG. 9 presents some different variants of final allocation in PRBs in presence of forbidden symbols.

If the number of forbidden symbols is the same in all D-PRBs but do not occupy the same positions, at least three solutions can be contemplated. The first one consists in mapping D-BDUs just as if all D-PRBs share the same pattern of forbidden symbols and simply puncturing symbols that shall be mapped onto forbidden ones. Then, all D-BDUs still occupy all the positions such as in a L-PRB, but some BDUs are punctured and others not possibly leading to different level of performance. A second solution is to map symbols onto available positions using the same PRB mapping law. The limitation of this approach is that all D-BDUs do not occupy any more the same positions. A third solution is to operate just as in the first option but mapping symbols that shall be mapped onto forbidden positions onto the newly available positions. These three options are illustrated on FIG. 9 with M=N=4, K=L=3, $N_{FS}$=4 and S=12. This figure illustrates the mapping of 3 D-DBUs 9.1, 9.2, 9.3 onto 3 D-PRBs. The first solution is illustrated by the mapping of the 3 D-PRBs 9.11, 9.12 and 9.13, where on can see that, the second D-PRBs have a different localisation of forbidden symbols, represented as textured positions. This first solution leads to the puncturing of the fourth symbol, referenced with a 'P', which would have been mapped on a forbidden symbol, while the second position of the D-PRB, marked as 'V' is void. The second solution is illustrated by D-PRBs 9.21, 9.22 and 9.23. One can see that all available positions are used at the price of a slightly different mapping for D-PRB 9.22. The third solution is illustrated by D-PRBs 9.31, 9.32 and 9.33. keeping globally the same mapping as the first solution but mapping the fourth symbol to the void position instead of puncturing it.

If the number of forbidden positions is not the same in all D-PRBs, the same procedure can be applied taking for $N_{FSmax}$ the maximum number of forbidden positions in a D-PRB. Then, the occurrence of puncturing or leaving free some positions will occur not in all D-PRBs but just in some D-PRBs depending on the effective number of forbidden positions for each particular D-PRB.

The proposed method can be easily modified to support an efficient mapping of MIMO encoded symbols where it is required to benefit from the same channel conditions for a given number of symbols. For instance, in the case of the Alamouti scheme, it is very important to keep the two elements of each pair adjacent within the D-PRBs. This can be achieved by multiplexing the modulation symbols of BDUs, with an even value of S, and then applying a snake either in time or frequency. More, generally the proposed invention can be applied to map groups of symbols of any size as required by specific transmission schemes.

An advantage of the proposed invention is to maintain a regularity within the symbols mapped in all D-PRBs even if the PRB structure is not regular itself. This is due to the fact that multiplexing of streams is performed independently of the mapping of the data. This greatly facilitates the implementation avoiding unnecessary testing to determine the position of each stream's symbols.

In other words, considering that D-PRBs embed a given number of forbidden symbols, not necessarily at the same positions, and that some D-PRBs have additional forbidden symbols, the number of available symbols S is set as or below to the total number of symbols in a D-PRB reduced by the common number of forbidden symbols. The number of D-PRBs is set to L possibly as a sub-multiple of S. Each D-BDU is described as an array of symbols according to a law that covers all the positions, only once, of a D-PRB at the exception of forbidden symbols. The law is potentially different within each D-PRB. Data streams are segmented into packets of S symbols, the BDUs. Mapping is applied in D-PRBs with multiplexing of streams according to the laws mentioned above and mapped within the D-PRB following the path described by the selected law. When meeting additional forbidden symbols, the corresponding data is punctured. Remaining positions are left void and used for other purpose.

The key of the proposed technique is that if all D-BDUs are mapped within D-PRBs according to the same law and if D-PRBs share the same pattern of forbidden positions, then all distributed BDUs globally occupy the same set of positions within D-PRBs which are the same as in a localized PRB with the same mapping. As the size of localized and distributed PRB is the same, it is possible to switch from distributed to localized mode depending on the channel conditions. This also avoids the system handling two different payload sizes depending on the allocation mode. The impact of the error on the channel estimation achieved from scattered pilots is also equally spread among the different streams. The scheme is also compatible with the simplified signaling approach using, for example, the table based solution. For instance, with the first multiplexing law, the position of the allocated VRB among the D-PRBs indicates in which D-PRB the allocated stream occupies the first position according to the selected mapping. This invention permits benefiting from a better diversity and an increased number of allocated streams benefiting from the same level of diversity. The invention also permits under the same constraints of diversity to dynamically modify the number and the position of PRBs dedicated to distributed traffic. For instance, for the first multiplexing law, it is possible to select all sub-multiples of the number of mapped symbols in a PRB. Relaxing a little the constraint of equal diversity, the number of PRB can even be modified to any value below the total number of positions into a PRB. Thanks to the proposed invention, all D-PRBs benefit from a inherent frequency diversity due to the fact that all symbols corresponding to a specific stream are mapped both in time and frequency. It allows spreading data from different streams on several physical resource blocks in a way where, within a physical resource block, each sub-carrier carries on data from different streams and during each symbol time, data from different streams are transmitted.

It is required to indicate the position of the D-PRBs if it is dynamic and the mapping law within each PRB. If the mapping law is the same within all D-PRBs and position of forbidden symbols is the same, then all streams occupy all the positions of a D-PRB, at the exception of punctured symbols, leading to an even degradation due to channel estimation for all streams and a simplified implementation.

In some embodiments of the invention, the particular configurations where the size of the physical resource blocks, the choice of a multiplexing law and to the mapping law from D-BDUs to D-PRBs and the particular position of the forbidden symbols would lead to a result where data from one stream occupy a complete sub-carrier or a complete symbol time within the D-PRBs are discarded. Some changes in the parameters are then done to forbid such situations where a deep fading on a sub-carrier or during a symbol time would concentrate its effect onto the given stream.

One advantage of the proposed invention lies in its low complexity in terms of implementation especially for systems that support localized transmission. Let's consider the application of the proposed invention to an OFDMA multi-user cellular system. As previously mentioned, data are typically provided to the physical layer as PDUs to be transmitted over a TTI, where a PDU is allocated a given number of VRBs. A typical approach is to encode the PDUs and to store over each transmission interval the resulting symbols into a memory that is organised as a bank of smaller memories corresponding to the number of VRBs within the transmission interval. This operation corresponds to the segmentation of the PDUs into BDUs. A key function in an OFDM system is performed by the framing module that builds the OFDM multiplex to be modulated over each symbol duration. The OFDM multiplex and thus the PRBs are often built OFDM symbol by OFDM symbol and within each OFDM symbol going through sub-carriers from the left to the right (increasing or decreasing frequencies). One issue is to achieve the mapping of BDUs inside the PRBs. Let's first consider the case of localized transmission. The mapping is simply a way of covering all available positions for data in a PRB in order to benefit for example of some stationnarity of the channel. It can also be a solution for spreading the data within a PRB in order to maximise diversity. This operation consists in mapping the content of a one-dimensional (ID) array, i.e. the BDU, into the PRB that is a 2D array. Dealing with implementation, the mapping can be applied in different ways. A first one is to store the content of the BDU in a 2D array corresponding to the PRB structure according to the mapping law. Then, with a latency of one transmission interval, the OFDM symbols can be built accessing the 2D array by rows for each new OFDM symbol. According to the way OFDM symbols are built, the PRB can be viewed as a 1D array which is the concatenation of 1D arrays obtained by slicing the PRB in the time domain. This is described as a flattened PRBs. As a result, the mapping can be viewed as an interleaving law between two 1D arrays. The mapping can simply be achieved using a table (typically a ROM) that stores for each position of the flattened PRB the address of the BDU sample that shall be mapped onto that position. This approach allows applying a 2D mapping without having to first build the PRBs with the BDUs before actual transmission. Using the principle of the interleaving array, the PRB can be build on an OFDM symbol by OFDM symbol basis thus reducing the latency and the required amount of memory.

Different approaches can be envisioned to support distributed traffic. On the base station side, a simple approach consists in applying the invention as a two-step procedure. The DBUs corresponding to distributed streams are first multiplexed together and the resulting D-BDUs can then be mapped into D-PRBs according to any mapping law. Then, the framing module can build the OFDM symbols just as for localized traffic. On the mobile terminal side, a basic approach is to perform the dual operation. But this requires to store the data associated to all D-PRBs to then perform the de-multiplexing operation. As a matter of fact, the de-framing module is able to perform the extraction of the data only for the selected stream (one or more BDUs) on an OFDM symbol by OFDM symbol basis. Let's first consider the case of localized PRBs. The receiver must perform the demapping of the PRB. This can be done by simply storing in a ROM the address in the corresponding BDU of each symbol in the PRB. Then, when accessing the symbols over each sub-band and each OFDM period, the receiver can directly stores the symbols in the corresponding BDU bank at the right position. A procedure of the same kind can be applied for distributed traffic. Let's first consider the PRB corresponding to the VRB to be extracted. In this PRB with the first multiplexing approach, the stream occupies the first position in the PRB according to selected mapping law. It also occupies all positions $N_{D\text{-}PRB}$ apart in the PRB going through the PRB positions according to the selected mapping law. Just as for local-ized traffic, the receiver is able to know the position in the BDU of each PRB symbol. What is needed in the case of distributed traffic is to determine if the symbol is associated to the stream to be extracted. By simply dividing the position in the D-BDU (content of the mapping ROM) of the sample modulo the number of D-PRBs, all symbols for which the result is zero is associated to the stream to be extracted. Then, the de-framing stores the corresponding sample at the correct position in the corresponding BDU. This operation can be done for all the data symbols in the D-PRB on an OFDM symbol basis. The same procedure can be applied to the other D-PRBs. For instance with the first multiplexing law, for a BDU allocated onto the VRB corresponding to the second D-PRB in the channel, the first symbol is stored in the first position of the second D-PRB, the second one into the second position in the following D-PRB and so one. In each D-PRB, the user always occupies all positions $N_{D\text{-}PRB}$ apart in the PRB going through the PRB positions according to the selected mapping law but with a specific offset depending on the rank of the D-PRB among all D-PRBs. In these D-PRBs, the selection of the correct symbols is done looking at positions for which the result of the modulo division gives no more zero but the offset associated to the D-PRB. Thus going through all D-PRB from OFDM symbol to OFDM symbol and within each OFDM symbol from the sub-carrier to sub-carrier, it is possible to extract the symbols associated to the stream. As a result, the overhead compared to localized traffic mainly lies in the modulo division operation. It can be noticed that a similar procedure can be applied at the transmitting site for building D-PRBs from BDUs.

This implementation is even simpler when data are mapped the same way in all D-PRBs according to the first multiplexing law and a linear mapping in frequency. Let's first consider the case of localized mapping. With linear mapping, data are stored in the BDU just as they are mapped into the flattened PRB. Then, the framing for D-PRBs can be directly achieved from the memory containing the BDUs where the memory is read in a linear manner. In the case of distributed traffic, the stream allocated to the VRB corresponding for example to the second D-PRB occupies the first position in this D-PRB, the second position in the following D-PRB and so on modulo the number of D-PRBs. The mapping can therefore be applied just as for localized PRB but shifting to the next D-PRB for each new symbol to be mapped, this for the number of available data positions in each slice of a PRB. In this approach, the stream multiplexing and the mapping are achieved altogether. The mapping and framing can also be achieved on a D-PRB basis, i.e. mapping each time slice of each D-PRB in one pass. This can be done accessing linearly the BDUs of the streams to be multiplexed but shifting of one BDU for each new symbol to be mapped. A similar procedure can be applied at the receiving side. For example, for the stream allocated to the VRB corresponding to the second D-PRB, the receiver reads the first symbol in this D-PRB, then reads the second symbol not in the same PRB such as for localized traffic, but in the second D-PRB and so on for the number of available positions for data in the first slice of a PRB. Then, the same procedure can be applied for the second OFDM symbol and so on.

The invention also permits to mitigate inter-cell interference in cellular networks. In such systems, signals from neighbouring cells interfere with each other. If the mapping of distributed transmissions is the same in all cells, there may be cases in which the inter-cell interference is not enough random. For instance, if same PRBs are allocated to distributed traffic in all cells and the mapping of D-VRBs on these PRBs is done the same way, one D-VRB is interfered by a single D-VRB of a neighbouring cell. If the interfering D-VRB is not allocated, the interference is null, if the interfering D-VRB is received with low power, the interference has low power and if the interfering D-VRB is received with high power, the interference has high power. There is a strong lack of diversity. On the other hand, if the DVRB is interfered by symbols from many D-VRBs of a neighbouring cell, the interfering power is averaged over the received power of many D-VRBs. The diversity is increased and all D-VRBs of the interfered cell experience an average interference power. There are not highly interfered D-VRBs, slightly interfered D-VRBs and non-interfered D-VRBs anymore. The inter-cell interference is randomized and thus averaged over D-VRBs. In order to obtain this desired randomisation of the inter-cell interference, the mapping of distributed transmissions may advantageously be varied from one cell to another. A general way is to add frequency hopping after the mapping, i.e., to permute the data symbols after mapping in a way which is specific to the cell and can be determined for example from the cell identity (ID or cell signature).

In the case of the first multiplexing law, the proposed mapping can be modified by introducing a parameter s, which is cell-specific. Instead of having two consecutive data of a given D-VRB transmitted on two consecutive PRBs modulo the number of D-PRBs, the first data is always transmitted on the first PRB but the second data is transmitted in a consecutive PRB with a shift of two PRBs modulo the number of D-PRBs. It randomizes the inter-cell interference by a straightforward change in the mapping procedure. This embodiment of the invention is based on a multiplexing law where data of index (i, j) in a BDU is placed in D-BDUs at index (k, l) where:

$$k=i; \text{ and}$$

$$l=(i+j+s)\bmod L.$$

where s is an cell-specific integer such that $1 \leq s \leq$. As a result, L−1 different mappings are obtained by using this cell-specific fixed step size. Best mappings are obtained if s is a prime with L. In the latter case, we can show that different values of s can be interpreted as different permutations of PRBs allocated to the distributed mapping.

The 3GPP consortium is currently working on the evolution of the 3GPP radio-access technology as part of the Long Term Evolution (LTE) work item [www.3gpp.com]. The goal is to define a high-data-rate, low-latency and packet-optimized radio-access technology suitable for the future generation of radio-mobile cellular systems. The OFDMA technique has been selected as a candidate for downlink transmission. Several combinations are contemplated in terms of duplex scheme and frame format. We consider here the FDD option with no-coexistence issue where data is transmitted over 10 ms frames made of 20 sub-frames where each 0.5 ms sub-frame is itself composed of 7 OFDM symbols. A particularity of the LTE system is the support of different channel bandwidths to allow for a better use of the spectrum resources that appear to be fragmented in some areas. Each base station may operate in 1.25, 2.5, 5, 10, 15 or 20 MHz channels. Each user equipment (UE) shall be able to operate by default in 20 MHz channels and shall adapt automatically to the base station bandwidth it is connected to. According to the FDMA access scheme, the OFDM multiplex is divided into a number of sub-bands made of 12 consecutive sub-carriers, thus leading to the definition of physical resource blocks made of M=12 sub-carriers in the frequency domain and N=7 OFDM symbols in the time domain. The maximum number of available positions in a PRB is therefore equal to R=M×N=84.

The PRBs can be dynamically allocated to streams either in localized or distributed mode. The present invention can therefore be applied to the LTE system. The flexibility of the proposed invention is particularly well suited to the LTE system where the number of PRBs goes from 6 for the 1.25 MHz bandwidth to 100 in 20 MHz channels. PRBs may carry at least two kinds of forbidden symbols, reference symbols and signaling symbols. The number of reference symbols depends on the number of transmit antennas with a minimum number of 4 occupied symbols per PRB for one transmit antenna. In addition, the position of the reference symbols is the same in all the PRBs within a sub-frame. As a result, when applying specific embodiments of the proposed method, all distributed UEs occupy all the positions such as in a localized PRB with the corresponding advantages. The present invention provides a great flexibility for the actual implementation of the distributed transmission.

Figure 10:
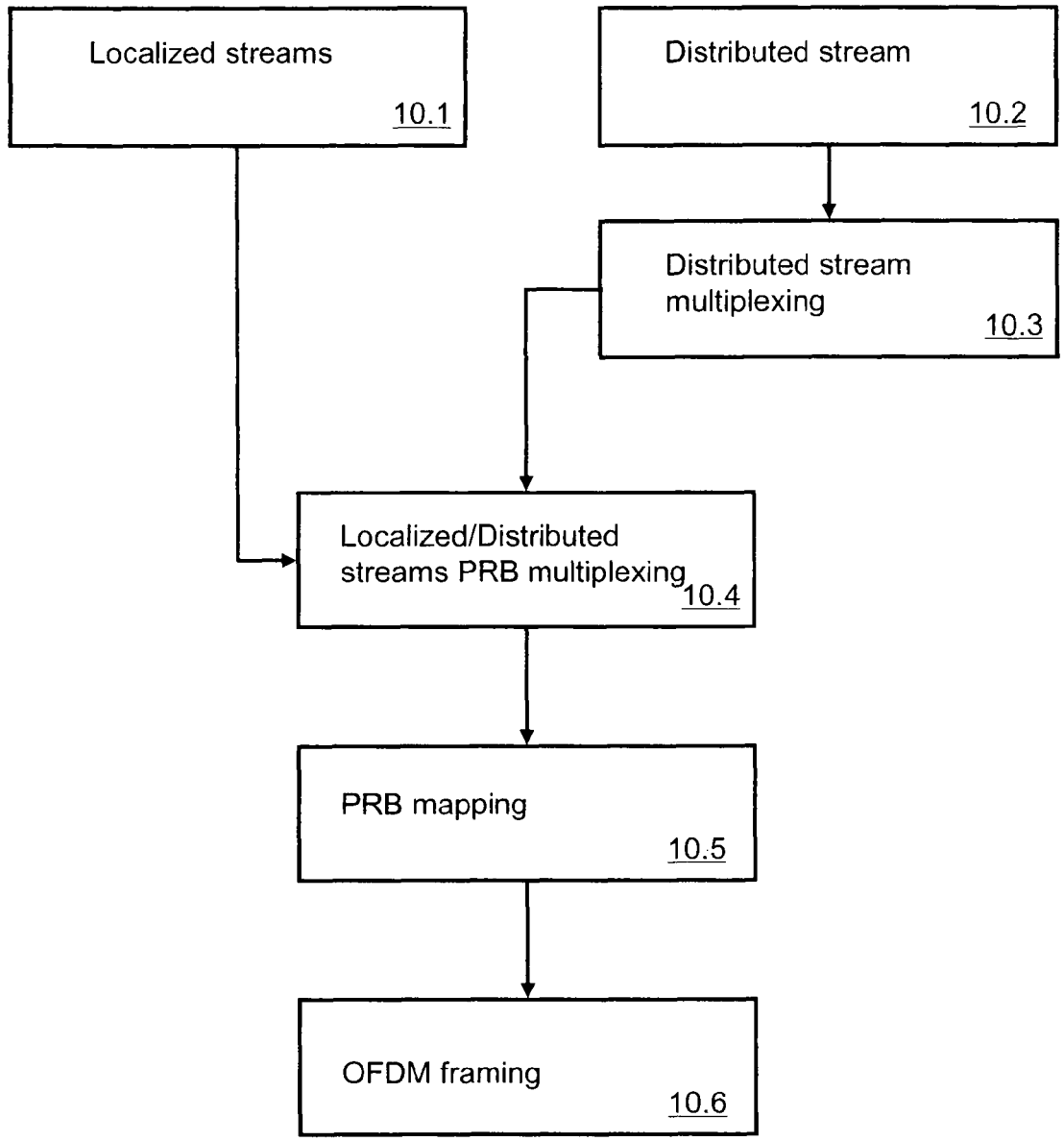
FIG. 10 displays the functional diagram of a embodiment of the invention.

FIG. 10 displays the functional diagram of a particular embodiment of the invention. First, the BDUs to be distributed 10.2 are multiplexed together according the selected law in the module 10.3. At that level, data are manipulated simply as one-dimension streams without any relation with the actual mapping of data onto the OFDM sub-frame. This module 10.3 provides L BDUs of data corresponding to the L distributed PRBs in the multiplex. These BDUs can then be manipulated just localized traffic. The streams corresponding to localized 10.1 and distributed PRB can therefore be multiplexed according to any appropriate law by the module 10.4. The different BDUs can then be organised, by the module 10.5, as two-dimensional arrays taking into account the PRB structure according to any mapping law. The content of the resulting arrays can then be read by the framing module 10.6 that builds the OFDM multiplex associated to each OFDM symbol of the frame according to the appropriate frame format.

Figure 11A:
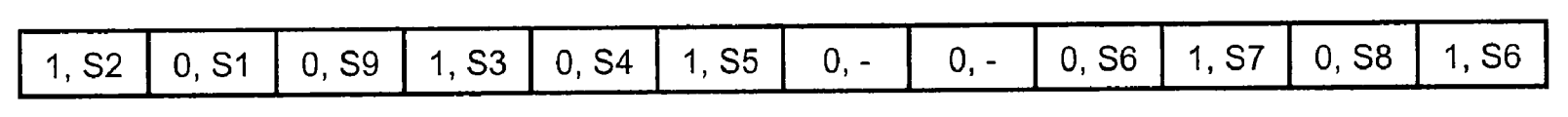

FIG. 11 depicts an application of the proposed scheme in the case of the 2.5 MHz bandwidth, thus with 12 PRBs in the channel. It is supposed that the system supports only one transmit antenna. The parameter S is set to the actual number of available positions with 4 reference symbols per PRB, S=R−4=80 positions. Distributed streams are mapped onto 5 PRBs according to the same format, namely the first multiplexing law combined with a 2D mapping linear in frequency. It is supposed that the position of the D-PRBs can be modified on a sub-frame basis with a signalling achieved according to the table based approach. For simplification purpose, it is supposed that signalling is transmitted outside PRBs and is reduced to one bit indicating whether the PRB is distributed or not and an UE identifier. For localized transmissions, the signalling table entry of rank i provides the identity of the UE that is allocated to the PRB of the same rank. For distributed transmissions, the rank of the UE identifier within the L distributed PRBs indicate on which D-PRB the corresponding UE is mapped onto the first available position. FIG. 11-*a* depicts an example of content of the signalling table. As shown on FIG. 11-*a*, PRBs numbers 0, 3, 5, 9 and 11 are devoted to distributed traffic, signalled on the table by the first information set to 1. The remaining PRBs are devoted to localized traffic, signalled on the table by the first information set to 0. The second information gives the reference of the stream that is allocated to the PRB. FIGS. 11*b*, 11*c*, 11*d*, 11*e* and 11*f* display the result of the mapping within distributed PRBs for the 5 allocated streams where symbols marked as "P" are forbidden pilot symbols and where the other symbols are marked with the same convention as above indicating the index within the source BDU and the index of the BDU.

The allocation of the signalling is not yet clearly defined in the LTE but it shall be multiplexed with data in time over at most the first three OFDM symbols over each TTI duration (2 consecutive sub-frames). The main difference with reference symbols is that the number of symbols dedicated to signalling may not be the same in all distributed PRBs. In the present case, we consider the 2.5 MHz bandwidth with 12 PRBs among which L=4 are affected to distributed traffic. FIG. 12 depicts an example of application of the proposed method taking into account the transmission of signalling in addition to reference symbols. In that particular example, the PRB is defined with a transmission interval equal to the TTI duration made of 2 consecutive sub-frames, i.e. 14 OFDM symbols (N=14). It is supposed that the base station supports 4 transmit antennas. In addition, distributed PRBs include signaling symbols, referenced as "S" on the figure, inserted in the first OFDM symbols of the PRBs. FIG. 12 illustrates a situation where all the PRBs do not contain the same number of signaling symbols. Actually, the PRBs contain signaling in the first two OFDM symbols of each TTI corresponding to the first two lines of the four PRBs illustrated FIGS. 12a, 12b, 12c and 12d. In addition, the PRB of FIG. 12b has 3 extra signaling symbols inserted on the 3 first sub-carrier positions in the third OFDM symbol. To optimise the spectral resources, the parameter S is computed taking into account only the signalling symbols in the two first OFDM symbols, thus 16 symbols, thus S=128. In the present case, we consider the 2.5 MHz bandwidth with 12 PRBs among which L=4 are affected to distributed traffic. Data symbols falling onto the positions of the 3 extra signaling symbols, shown as scored out on the figure, are simply punctured as shown on FIG. 12b.

Figure 13:
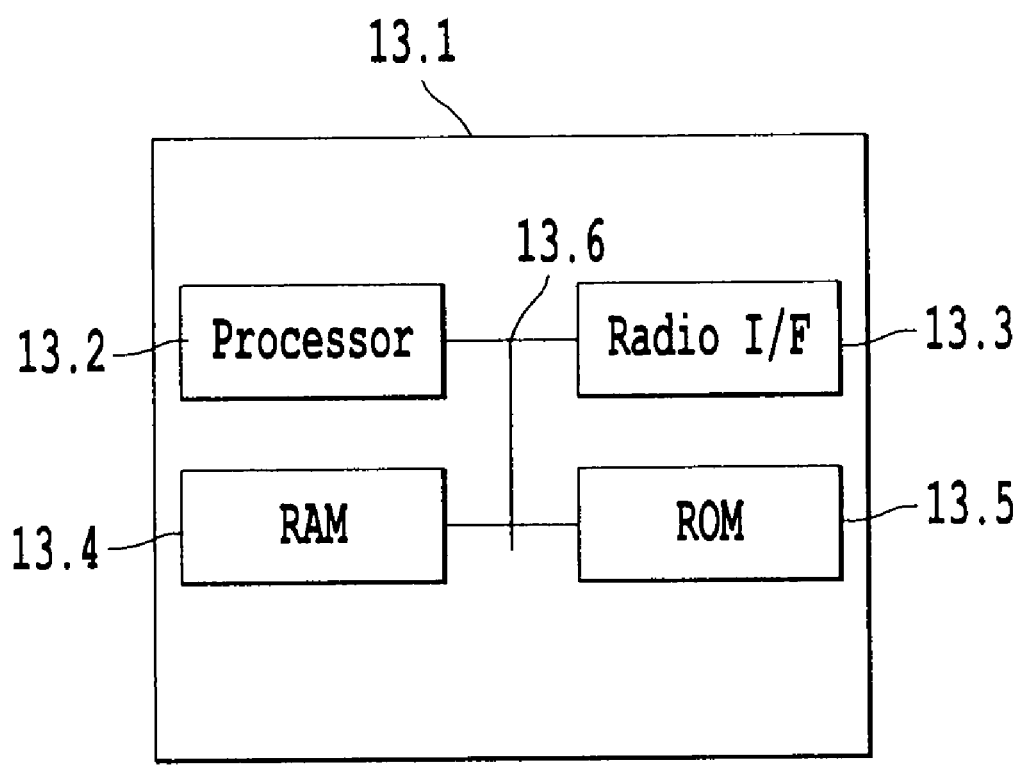
FIG. 13 presents a general architecture of a particular embodiment of a transmission device.

FIG. 13 presents a general architecture of an embodiment of a transmission device 13.1 able to set up the described methods. It has to be noted here that the transmission device 13.1 is, in a variant, implemented under the form of one or several dedicated integrated circuits which execute the same operations as the one executed by the processor 13.2 as disclosed hereinafter. This device comprises a radio module 13.3 to receive and transmit signals. Data to be transmitted are generated by the processor 13.2 which is able to execute programs implementing the various described methods. These programs could be stored in a read only memory, ROM, 13.5 or in a random access memory 13.4. When implementing the various described methods a work space is created in the random access memory 13.4 which can host the different buffer corresponding to PDUs, BDUs, D-BDUs. These modules are linked by a bus 13.6 which allows communication between the different modules. The radio module 13.3 is controlled by the processor 13.2.

The invention claimed is:

1. A method of data transmission in a multi-carrier based transmission system, the transmission being made over a channel shared among a number of data streams according to a frequency division multiple access scheme, data from different sources or to different destinations being sent by streams of symbols, a plurality of physical resource blocks being defined as blocks constituted by a given number of consecutive sub-carriers and a transmission time of a given number of symbol durations, some of these streams being transmitted in a distributed mode, comprising:

distributing some of the distributed streams onto at least one distributed physical resource block in a second distributed mode, the distributing including:
spreading symbols of the distributed streams onto and within the distributed physical resource blocks in a way where each sub-carrier and each symbol time of the distributed physical resource blocks will be allocated with symbols from at least two different streams, and multiplexing symbols from a first plurality of L data blocks, fed with symbols from the distributed streams, to a second plurality of L data blocks to be allocated to distributed physical resource blocks using a modulo operation, wherein each data block of the first and second plurality of data blocks is of size S with symbols thereof indexed from 0 to S−1, each data block of the first and second plurality of data blocks is indexed from 0 to L−1, each symbol of index i of a data block of index j of the first plurality of data blocks is multiplexed to a symbol of index k of a data block of index l of the second plurality of data blocks, at least one of k and l is determined based on a modulo operation including i or j as a parameter, and S, L, i, j, k, and l are non-negative integers.

2. The method according to claim 1, wherein and l=(i+j) mod L.

3. The method according to claim 1, wherein L is a submultiple of S, k=(i+j) mod L+[i/L]*L, and l=i mod L.

4. The method according to claim 1, wherein L is a submultiple of S, k=(i+j) mod S, and l=i mod L.

5. The method according to claim 1, wherein L is a submultiple of S, s is chosen between 1 and L inclusive, k=i, l=(i+j+s) mod L, and s is a non-negative integer.

6. The method according to claim 5, wherein the transmission system is cellular and the s parameter is dependent of a cell in which the method is used.

7. The method according to one of claims 2 to 6, further comprising:

allocating, in a final step, the symbols of the second plurality of data blocks to the distributed physical resource blocks.

8. The method according to claim 7, wherein the size S of the data blocks is equal to the size of the distributed physical resource blocks and each symbol of each data block of the second plurality of data blocks is allocated to the symbol of same index in a corresponding physical resource block.

9. The method according to claim 8, wherein some of the symbols in the physical resource blocks are forbidden and the symbols allocated to these forbidden symbols are punctured.

10. The method according to claim 7, wherein some of the symbols in the distributed physical resource blocks are forbidden, S is equal to the number of available symbols in the physical resource blocks, and each symbol of each data block of the second plurality of data blocks is allocated to the symbol of same index in the subset constituted by the available symbols of a corresponding physical resource block.

11. The method according to claim 7, wherein some of the symbols in the distributed physical resource blocks are forbidden, S is greater than a number of available symbols in the resource blocks and lower than or equal to the total number of symbols of the resource blocks, each symbol of each data block of the second plurality of data blocks is allocated to the symbol of same index in a corresponding physical resource block, and symbols allocated to forbidden symbols are punctured.

12. The method according to claim 7, wherein some of the symbols in the distributed physical resource blocks are forbidden, a number and/or position of the forbidden symbols is variable within the physical resource blocks, S is greater than a minimum number of available symbols in the resource blocks and lower than or equal to the total number of symbols of the resource blocks, each symbol of each data block of the second plurality of data blocks is allocated uniformly to the symbol of a same index in a corresponding physical resource block, the index being defined uniformly on a subset of symbols of the physical resource blocks, and symbols allocated to forbidden symbols are punctured.

13. The method according to claim 7, wherein some of the symbols in the physical resource blocks are forbidden, a number and/or position of the forbidden symbols is variable within the physical resource blocks, S is greater than a minimum number of available symbols in the physical resource blocks and lower than or equal to the total number of symbols of the physical resource blocks, each symbol of each data block of the second plurality of data blocks is allocated uniformly to the symbol of a same index in a corresponding physical resource block, the index being defined uniformly on a subset of symbols of the physical resource blocks, and symbols allocated to forbidden symbols are allocated to non-allocated available symbols.

14. The method according to claim 1, further comprising: allocating, in a first step, symbols from the different streams in the first plurality of data blocks.

15. The method according to claim 1, wherein symbols from the different streams are directly allocated into the physical resource blocks.

16. A data transmission device in a multi-carrier based transmission system, the transmission being made over a channel shared among a number of data streams according to a frequency division multiple access scheme, data from different sources or to different destinations being sent by streams of symbols, the physical resource blocks being defined as blocks constituted by a given number of consecutive sub-carriers and a transmission time of a given number of symbol durations, some of these streams being transmitted in a distributed mode, comprising:
- distributed allocation means for allocating some other distributed streams onto at least one distributed physical resource block in a second distributed mode the distributed allocation means including:
- spreading means for spreading the symbols of the distributed streams onto and within the distributed physical resource blocks in a way where each sub-carrier and each symbol time of the distributed physical resource blocks will be allocated with symbols from at least two different streams, and
- multiplexing means for multiplexing symbols from a first plurality of L data blocks, fed with symbols from the distributed streams, to a second plurality of L data blocks to be allocated to distributed physical resource blocks using a modulo operation,
- wherein each data block of the first and second plurality of data blocks is of size S and indexed from 0 to S−1, each plurality of data blocks is indexed from 0 to L−1, each symbol of index i of the data block of index j of the first plurality of data blocks is multiplexed to a symbol of index k of the data block of index l of the second plurality of data blocks, at least one of k and l is determined based on a modulo operation including i or j as a parameter, and S, L, i, j, k, and f are non-negative integers.

* * * * *